(12) United States Patent
Wang

(10) Patent No.: US 12,538,295 B2
(45) Date of Patent: Jan. 27, 2026

(54) MCCH SCHEDULING TRANSMISSION METHOD AND APPARATUS, AND TERMINAL DEVICE

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 343 days.

(21) Appl. No.: 18/314,658

(22) Filed: May 9, 2023

(65) Prior Publication Data

US 2023/0276433 A1   Aug. 31, 2023

Related U.S. Application Data

(63) Continuation of application No. PCT/CN2020/142455, filed on Dec. 31, 2020.

(51) Int. Cl.
  *H04W 72/1263*  (2023.01)
  *H04W 56/00*    (2009.01)
  *H04W 72/232*   (2023.01)

(52) U.S. Cl.
  CPC ... *H04W 72/1263* (2013.01); *H04W 56/0015* (2013.01); *H04W 72/232* (2023.01)

(58) Field of Classification Search
  CPC .......... H04W 72/1263; H04W 72/232; H04W 56/0015
  See application file for complete search history.

(56) References Cited

U.S. PATENT DOCUMENTS

| | | | |
|---|---|---|---|
| 2017/0332359 A1* | 11/2017 | Tsai | H04W 68/02 |
| 2018/0026698 A1 | 1/2018 | Lee et al. | |
| 2020/0137528 A1 | 4/2020 | Ai et al. | |
| 2020/0287609 A1 | 9/2020 | Lee et al. | |
| 2020/0383022 A1* | 12/2020 | Shrestha | H04W 36/362 |
| 2020/0389874 A1* | 12/2020 | Lin | H04L 5/0053 |
| 2021/0007065 A1* | 1/2021 | Ko | H04W 56/00 |
| 2021/0037488 A1* | 2/2021 | Ko | H04W 56/001 |

(Continued)

FOREIGN PATENT DOCUMENTS

| | | |
|---|---|---|
| CN | 107889063 A | 4/2018 |
| CN | 110535542 A | 12/2019 |

(Continued)

OTHER PUBLICATIONS

Third Office Action of the Chinese application No. 202080105334.9, issued on Mar. 7, 2025, 19 pages with English translation.

(Continued)

*Primary Examiner* — Jael M Ulysse
(74) *Attorney, Agent, or Firm* — PERKINS COIE LLP

(57) ABSTRACT

Provided are an MCCH scheduling transmission method, a terminal device and a storage medium. The method comprises: a terminal device determining the correspondence (Continued)

between PDCCH occasions and SSB indexes, wherein a PDCCH occasion is used for transmitting an MCCH PDCCH; and the terminal device receiving the MCCH PDCCH on the basis of the correspondence between the PDCCH occasions and the SSB indexes.

20 Claims, 9 Drawing Sheets

(56) References Cited

U.S. PATENT DOCUMENTS

| | | | | |
|---|---|---|---|---|
| 2021/0076275 | A1* | 3/2021 | Yiu | H04W 36/0088 |
| 2021/0105808 | A1* | 4/2021 | Lei | H04L 5/0051 |
| 2021/0258918 | A1* | 8/2021 | Hong | H04W 36/0007 |
| 2022/0045805 | A1* | 2/2022 | Karaki | H04L 1/1864 |
| 2022/0045827 | A1* | 2/2022 | Lee | H04W 72/30 |
| 2022/0046690 | A1* | 2/2022 | Lee | H04W 4/08 |
| 2022/0353710 | A1* | 11/2022 | Yoshioka | H04W 4/06 |
| 2023/0309121 | A1 | 9/2023 | Wang | |
| 2023/0328762 | A1* | 10/2023 | Chai | H04W 72/30 370/329 |

FOREIGN PATENT DOCUMENTS

| | | |
|---|---|---|
| CN | 110535583 A | 12/2019 |
| CN | 111866749 A | 10/2020 |
| CN | 112087720 A | 12/2020 |
| CN | 116349309 A | 6/2023 |
| EP | 4240063 A1 | 9/2023 |
| WO | 2020255418 A1 | 12/2020 |

OTHER PUBLICATIONS

Second Office Action of the Chinese application No. 202080105334.9, issued on Dec. 5, 2024. 8 pages with English translation.
Second Office Action of the European application No. 20967883.8, issued on Dec. 11, 2024. 5 pages.
First Office Action of the European application No. 20967883.8, issued on Jun. 26, 2024, 6 pages.
OPPO, "Discussion on MBS reception of idle or inactive mode UE", 3GPP TSG-RAN W62 Meeting #112 electronic R2-2008869, Online, Nov. 2-13, 2020, Verses 2-4.
CMCC, "Discussion on NR MBS in RRC_IDLE/RRC_INACTIVE states", 3GPP TSG RAN WG1 #103-e R1-2008036, e-Meeting, Oct. 26-Nov. 13, 2020, pp. 1-3.
First Office Action of the Chinese application No. 202080105334.9, issued on Sep. 4, 2024, 24 pages with English translation.
Supplementary European Search Report in the European application No. 20967883.8, mailed on Nov. 10, 2023. 9 pages.
3GPP TSG RAN WG1 #103-e R1-2009276, e-Meeting, Oct. 26-Nov. 13, 2020, Agenda item: 8.12.3, Source: Qualcomm Incorporated, Title: Discussion on broadcast/multicast for RRC_IDLE and RRC_INACTIVE UEs, Document for: Discussion and Decision.
International Search Report in the international application No. PCT/CN2020/142455, mailed on Sep. 29, 2021.
Written Opinion of the International Search Authority in the international application No. PCT/CN2020/142455, mailed on Sep. 29, 2021.
3GPP TSG RAN Meeting #86 RP-193248, (revision of RP-193163), Sitges, Spain, Dec. 9-12, 2019, Source: Huawei, Title: New Work Item on NR support of Multicast and Broadcast Services, Document for: Approval, Agenda Item: 9.1.2.

* cited by examiner

US 12,538,295 B2

MCCH SCHEDULING TRANSMISSION METHOD AND APPARATUS, AND TERMINAL DEVICE

CROSS-REFERENCE TO RELATED APPLICATION

This application is a continuation of International Application No. PCT/CN2020/142455, filed on Dec. 31, 2020. The disclosures of which are hereby incorporated by reference in its entirety.

TECHNICAL FIELD

Embodiments of the application relates to the field of communication technologies, and particularly to a method for a Multicast Control Channel (MCCH) scheduling transmission, a terminal device and a storage medium.

BACKGROUND

In a New Radio (NR) system, broadcast type Multicast/Broadcast Services (MBSs) are supported. A terminal device can receive the broadcasted MBSs in a Radio Resource Control (RRC) idle state, a RRC inactive state or a RRC connected state.

In the NR system, broadcasted MBSs can be transmitted over an air interface in a way of beam sweeping. Signaling for configuring the MBSs, which is referred to as MCCH signaling (i.e., signaling carried in a MCCH), is also sent to the terminal device via broadcast. The MCCH signaling is also transmitted in the way of beam sweeping. It is required to determine how the terminal device receives the broadcasted MCCH signaling correctly.

SUMMARY

Embodiments of the application provide a method for a MCCH scheduling transmission, a terminal device and a storage medium.

The method for the MCCH scheduling transmission provided by an embodiment of the application includes the following operations.

A terminal device determines a correspondence between physical downlink control channel (PDCCH) occasions and Synchronization Signal/Physical Broadcast Channel (SS/PBCH) Block (SSB) indexes, a PDCCH occasion is used for transmitting a MCCH PDCCH.

The terminal device receives the MCCH PDCCH based on the correspondence between the PDCCH occasions and the SSB indexes.

A terminal device provided by an embodiment of the application includes a processor and a memory for storing a computer program, the processor is configured to call and run the computer program stored in the memory, to perform the above mentioned method for the MCCH scheduling transmission.

A non-transitory computer-readable storage medium provided by an embodiment of the application is used for storing a computer program which causes a computer to perform the above mentioned method for the MCCH scheduling transmission.

BRIEF DESCRIPTION OF THE DRAWINGS

The drawings described herein are used to provide a further understanding of the disclosure and form a part of the disclosure. The schematic embodiments of the disclosure and the description thereof are used to explain the disclosure and do not constitute an improper limitation of the disclosure, wherein.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as a Long Term Evolution (LTE) system, an LTE Frequency Division Duplex (FDD) system, an LTE Time Division Duplex (TDD) system, a 5G communication system or a future communication system.

Figure 1:
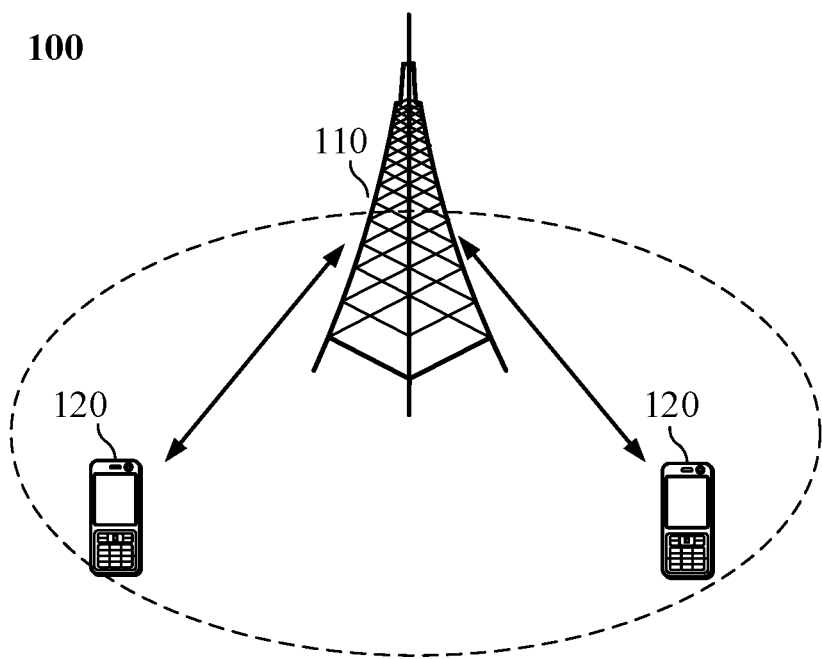
FIG. 1 is a schematic diagram of a communication system architecture provided by an embodiment of the present application.

Exemplarily, a communication system 100 to which the embodiments of the present disclosure are applied is illustrated in FIG. 1. The communication system 100 may include a network device 110. The network device 110 may be a device that communicates with a terminal device 120 (also referred to as a communication terminal, a terminal). The network device 110 may provide communication coverage for a specific geographic area and may communicate with a terminal device within the coverage area. In one example, the network device 110 may be an Evolutional Node B (eNB or eNodeB) in the LTE system or a wireless controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future communication system or the like.

The communication system 100 also includes at least one terminal device 120 located within the coverage of the network device 110. The "terminal" used herein includes, but is not limited to, connection via wired lines, such as connection via Public Switched Telephone Networks (PSTNs), Digital Subscriber Lines (DSLs), digital cables, direct cables; and/or another data connection/network; and/or via a wireless interface, such as for a cellular network, a Wireless Local Area Network (WLAN), a digital television network such as DVB-H network, a satellite network, a AM-FM broadcast transmitter; and/or means of another terminal arranged to receive/transmit a communication signal; and/or an Internet of Things (IoT) device. A terminal device configured to communicate via a wireless interface may be referred to as a "wireless communication terminal", "wireless terminal" or "mobile terminal". Examples of mobile terminals include, but are not limited to, satellite or cellular telephones; a Personal Communications System (PCS) terminal that may combine a cellular radio telephone with data processing, fax and data communications capability; a Personal Digital Assistant (PDA) that may include a radio telephone, a pager, Internet/intranet access, a Web browser, memo pad, calendar and/or Global Positioning System (GPS) receiver; and a conventional laptop and/or palmtop receiver or other electronic devices including a radio telephone transceiver. The terminal device may be referred to an access terminal, a User Equipment (UE), a subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved PLMN or the like.

In one example, Device to Device (D2D) communication may be performed between the terminal devices 120.

In one example, the 5G communication system or the 5G network may also be referred to as a New Radio (NR) system or NR network.

FIG. 1 exemplarily illustrates one network device and two terminal devices. In one example, the communication system 100 may include multiple network devices and another number of terminal devices may be included within the coverage of each network device, which is not limited in the embodiments of the present disclosure.

In one example, the communication system 100 may also include another network entity such as a network controller or a mobility management entity, which is not limited in the embodiments of the present disclosure.

It is to be understood that a device with communication function in the network/system in the embodiments of the present disclosure may be referred to as a communication device. Taking the communication system 100 illustrated in FIG. 1 as an example, communication devices may include the network device 110 and the terminal 120 with the communication function. The network device 110 and the terminal 120 may be specific devices mentioned above, and details are not described herein. The communication device may further include another device in the communication system 100, for example, another network entity such as a network controller or a mobility management entity, which is not limited in the embodiments of the present disclosure.

It is to be understood that terms "system" and "network" in the disclosure may usually be exchanged. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to facilitate understanding of the technical solutions according to the embodiments of the present disclosure, the technical solutions related to the embodiments of the present disclosure are described below.

With people's pursuit of speed, latency, high-speed mobility and energy efficiency, as well as the diversity and complexity of services in the future life, the International Organization for Standardization (ISO) of the 3rd Generation Partnership Project (3GPP) began to research and develop the 5G mobile communication technology (hereinafter abbreviated as 5G). The main application scenarios of 5G are: enhanced Mobile Broadband (eMBB), Ultra-Reliable Low-Latency Communication (URLLC) and massive Machine-Type Communication (mMTC).

On one hand, the aim of eMBB is still to enable users to access multimedia content, services and data, the demand thereof is growing very rapidly. On the other hand, eMBB may be deployed in different scenarios, such as indoor, urban and rural areas, the differences in the capabilities and the requirements are relatively large, so it cannot be generalized and must be analyzed in detail in combination with specific deployment scenarios. Typical applications of URLLC include industrial automation, power automation, telemedicine operation (surgery), traffic safety and so on. Typical characteristics of mMTC include high connection density, small data volume, delay-insensitive services, low cost and long service life of modules, and so on.

In the early deployment of NR systems, it is difficult to obtain complete NR coverage, so the typical network coverage is in a mode of wide-area LTE coverage and NR island coverage. Moreover, a large number of LTE systems are deployed below 6 GHz, and there are few spectra below 6 GHz available for 5G. Therefore, it is necessary for NR to study applications of spectra above 6 GHz, but the coverage of high frequency band is limited and the signal fades quickly. Furthermore, in order to protect previous investment of mobile operators in LTE, a working mode of tight interworking between LTE and NR is proposed.

RRC Status

In order to reduce air interface signaling and recover wireless connections and data services quickly a new Radio Resource Control (RRC) state, i.e., a RRC inactive (RRC_I-NACTIVE) state, is defined in 5G. This inactive state is different from a RRC idle (RRC_IDLE) state and a RRC active (RRC_ACTIVE) state, in which, 1) RRC_IDLE state (abbreviated as idle state): the mobility is a UE-based cell selection and reselection, a paging is initiated by a Core Network (CN), and a paging area is configured by the CN. There is no UE context and no RRC connection at the base station side.

2) RRC_CONNECTED state (abbreviated as connected state): a RRC connection exists, and a UE context exists at the base station side and the UE side. The network side knows that the location of the UE is specific to a cell level. The mobility is a mobility controlled by the network side. Unicast data can be transmitted between the UE and the base station.

3) RRC_INACTIVE state ((abbreviated as inactive state): the mobility is a UE-based cell selection and reselection, there is a connection between a CN and a NR, UE context exists on a certain base station, the paging is triggered by a Radio Access Network (RAN), the RAN-based paging area is managed by the RAN, and the network side knows that the location of the UE is based on paging area level of RAN.

Beam Sweeping

Figure 2:
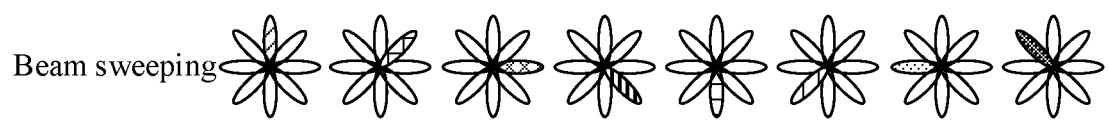
FIG. 2 is a schematic diagram of a Beam sweeping provided by an embodiment of the present application.
Figure 3:
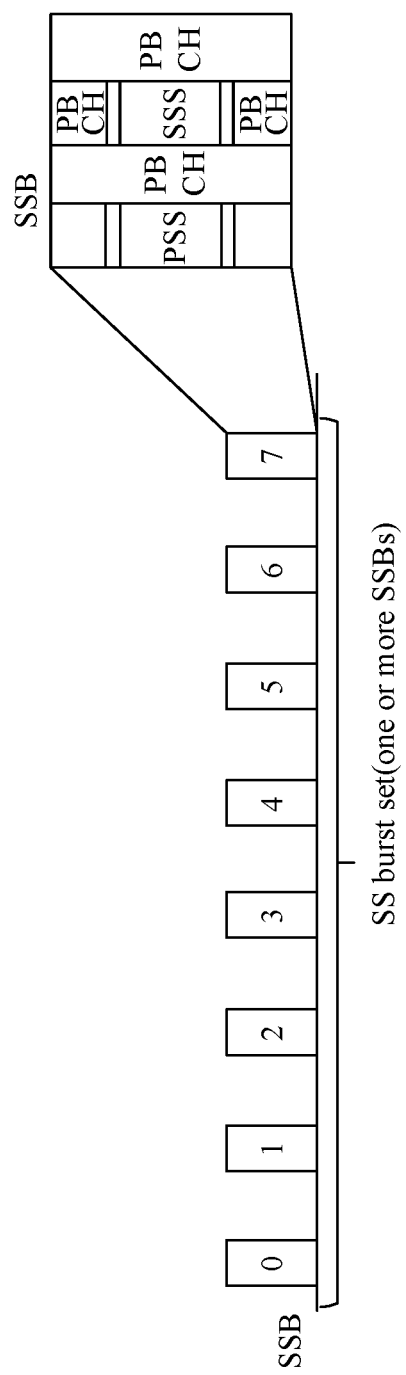
FIG. 3 is a schematic diagram of SSBs provided by an embodiment of the present application.
Figure 4:
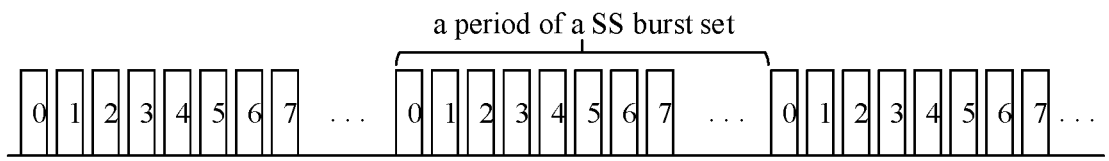
FIG. 4 is a schematic diagram of a period of an SSB burst set provided by an embodiment of the present application.

The NR will be deployed on high frequencies in the future. In order to improve the coverage area, in 5G, a beam sweeping mechanism is introduced to meet the requirements of coverage (coverage is obtained based on space and space is obtained based on time), as shown in FIG. 2. After the beam sweeping is introduced, synchronization signals are required to be transmitted from all beam directions. As shown in FIG. 3, the synchronization signals in 5G is given in a form of SSBs, including a Primary Synchronization Signal (PSS), a Secondary Synchronization Signal (SSS) and a Physical Broadcast Channel (PBCH). As shown in FIG. 4, the synchronization signals in 5G appear periodically in the time domain in a form of SS burst sets.

Multimedia Broadcast/Multicast Service (MBMS)

The MBMS is a technology in which data is transmitted from one data source to multiple terminal devices via shared network resources, which can effectively utilize network resources while providing multimedia services, and realize broadcasting and multicast of multimedia services with higher speed (such as 256 kbps).

Due to the low spectrum efficiency of the MBMS, it is not enough to effectively carry and support the operation of mobile TV type services. Therefore, in the LTE, enhancing the capability for supporting downlink high-speed MBMS services is explicitly proposed and the design requirements for physical layers and air interfaces are determined, via 3GPP.

In 3GPP R9, an evolved MBMS (eMBMS) is introduced into the LTE. In the eMBMS, a concept of a Single Frequency Network (SFN), that is, a Multimedia Broadcast/multicast service Single Frequency Network (MBSFN), is proposed. In the MBSFN, service data is transmitted in all cells simultaneously with unified frequencies, but the synchronization between cells must be ensured. With such method, the overall signal to noise ratio distribution of the cells can be greatly improved, and the spectrum efficiency may be greatly improved accordingly. In the eMBMS, broadcasting and multicasting of services are implemented based on the IP multicast protocol.

In the LTE or LTE-Advanced (LTE-A), for the MBMS, there is only broadcast bearer mode, but no multicast bearer mode. In addition, the reception of the MBMS service is applicable to a terminal device in the idle state or connected state.

A concept of Single Cell Point to Multipoint (SC-PTM) is introduced in 3GPP R13. The SC-PTM is based on a MBMS network architecture.

In the MBMS, new logical channels, including a Single Cell-Multicast Control Channel (SC-MCCH) and a Single Cell-Multicast Transport Channel (SC-MTCH), are introduced. The SC-MCCH and the SC-MTCH are mapped to a Downlink-Shared Channel (DL-SCH). Further, the DL-SCH is mapped to a Physical Downlink Shared Channel (PDSCH). Herein, the SC-MCCH and the SC-MTCH belong to logical channels, the DL-SCH belongs to a transport channel, and the PDSCH belongs to a physical channel. A Hybrid Automatic Repeat reQuest (HARD) operation is not supported in the SC-MCCH and the SC-MTCH.

In the MBMS, a new System Information Block (SIB) type, i.e., SIB20, is introduced. Specifically, configuration information of the SC-MCCH is transmitted through the SIB 20 and there is only one SC-MCCH per cell. The configuration information of the SC-MCCH includes information about a modification period of SC-MCCHs, a repetition period of SC-MCCHs, a radio frame and subframe for scheduling SC-MCCHs and so on. Further, 1) the boundary of the modification period of SC-MCCHs satisfies SFN mod m=0, where SFN represents a system frame index of the boundary, and m is a modification period of SC-MCCHs configured in SIB20 (i.e., sc-mcch-ModificationPeriod). 2) the radio frame for scheduling SC-MCCHs satisfies: SFN mod mcch-RepetitionPeriod=mcch-Offset, where SFN represents a system frame index of the radio frame, mcch-RepetitionPeriod represents a repetition period of SC-MCCHs, and mcch-Offset represents an offset of SC-MCCHs. 3) The subframe for scheduling SC-MCCHs is indicated by sc-mcch-Subframe.

The SC-MCCHs is scheduled through Physical Downlink Control Channel (PDCCH). On the one hand, a new Radio Network Temporary Identity (RNTI), i.e., a Single Cell RNTI (SC-RNTI), is introduced to identify the PDCCH (e.g., SC-MCCH PDCCH) for scheduling the SC-MCCHs. Optionally, the value of SC-RNTI is fixed as FFFC. On the other hand, a new RNTI, i.e., a Single Cell Notification RNTI (SC-N-RNTI), is introduced to identify a PDCCH (e.g., notification PDCCH) for indicating a changing notification of the SC-MCCH. Optionally, the value of SC-N-RNTI is fixed as FFFB; Further, the changing notification may be indicated by one of eight bits of DCI 1C. In the LTE, configuration information of the SC-PTM is based on the SC-MCCH configured by SIB20, and then the SC-MCCH configures the SC-MTCH, which is used to transmit service data.

Specifically, the SC-MCCH transmits only one message (i.e., SCPTMConfiguration), which is used to configure the configuration information of the SC-PTM. The configuration information of the SC-PTM includes a Temporary Mobile Group Identity (TMGI), a session id, a Group RNTI (G-RNTI), Discontinuous Reception (DRX) configuration information and SC-PTM service information of an adjacent area. It should be noted that a Robust Header Compression (ROHC) function is not supported by the SC-PTM in R13.

Downlink discontinuous reception of the SC-PTM is controlled by the following parameters: onDurationTimerSCPTM, drx-InactivityTimerSCPTM, SC-MTCH-SchedulingCycle and SC-MTCH-SchedulingOffset.

The timer onDurationTimerSCPTM is started when [(SFN*10)+subframe number] modulo (SC-MTCH-SchedulingCycle)=SC-MTCH-SchedulingOffset is satisfied;

The timer drx-InactivityTimerSCPTM is started when the downlink PDCCH scheduling is received;

Downlink SC-PTM services are received only when the timer onDurationTimerSCPTM or drx-InactivityTimerSCPTM is running.

SC-PTM service continuity adopts the concept of MBMS service continuity based on SIB15, that is, a way of "SIB15+

MBMSInterestIndication". Service continuity of a terminal device in idle state is based on the concept of frequency priority.

According to the above description, the configuration of the SC-PTM is to configure the SC-MCCH based on SIB20, and then configure the SC-MTCH based on the SC-MCCH. A cell has and only has one SC-MCCH. That is to say, the terminal device needs to re-acquire a SC-MCCH after performing the cell reselection, which will lead to service interruption.

In NR system, multicast and broadcast service requirements are required to be supported in many scenarios, such as in the Vehicle-to-everything (V2X), in the industrial internet and so on. Therefore, it is necessary to introduce the MBMS into the NR.

It should be noted that the MBMSs in the above solution include but is not limited to multicast services, broadcast services, MBSs, etc. Embodiments of the present application are illustrated with MBSs as an example, the description of "MBSs" may also be replaced with "multicast services", "broadcast services" or "MBMSs".

In the NR system, the broadcast type MBSs are supported. The terminal device can receive broadcasted MBSs in the RRC idle state, the RRC inactive state or the RRC connected state.

In the NR system, the broadcasted MBSs can be transmitted by the way of beam sweeping over the air interface. Signaling for configuring MBS services is also sent to the terminal device by the way of broadcasting and this signaling is referred to as MCCH signaling (i.e., signaling carried in the MCCH), the MCCH signaling is also transmitted by the way of beam sweeping. It is required to determine how the terminal device receives the broadcasted MCCH signaling correctly. Therefore, the following technical solution of the embodiment of the application is proposed.

In the embodiments of the present application, the MCCH signaling can also be referred to as first signaling. The MCCH signaling is carried in the MCCH, the MCCH signaling is transmitted by the way of beam sweeping. That is, the MCCH PDSCH is transmitted by the way of beam sweeping. Accordingly, the MCCH PDCCH is transmitted by the way of beam sweeping. Therefore, an association relationship (i.e., a correspondence) which associates MCCH PDCCHs with SSB indexes is required, so that the terminal device can correctly receive the broadcasted MCCH PDCCH, thus correctly receive the broadcasted MCCH signaling.

In the technical solution according to the embodiments of the present application, a new SIB (also referred to as a first SIB) is defined. The first SIB includes configuration information of a first MCCH. Here, the first MCCH is a control channel for the MBS. In other words, the first SIB is used for configuring configuration information of the control channel for the NR MBS. Optionally, the control channel of the NR MBS can also be referred to as a NR MCCH (i.e., the first MCCH).

Further, the first MCCH is used for carrying the first signaling, and the name of the first signaling is not limited in the embodiments of the present application. For example, the first signaling may be signaling A. The first signaling includes configuration information of at least one first MTCH. Here, the first MTCH is a traffic channel of the MBS (also referred to as a data channel or a transmission channel). The first MTCH is used for transmitting MBS data (such as service data of the NR MBS). In other words, the first MCCH is used to configure the configuration information of the traffic channel of the NR MBS. Optionally, the traffic channel of the NR MBS may also be referred to as a NR MTCH (i.e., the first MTCH).

Specifically, the first signaling is used for configuring the traffic channel of the NR MBS, service information corresponding to the traffic channel and scheduling information corresponding to the traffic channel. Further, optionally, the service information corresponding to the traffic channel includes identification information identifying the service, such as a TMGI, a session id, etc. The scheduling information corresponding to the traffic channel includes, for example, a RNTI used when MBS data corresponding to the traffic channel is scheduled, such as a G-RNTI, DRX configuration information, etc.

It should be noted that the transmission of the first MCCH and the transmission of the first MTCH are scheduled based on a PDCCH. Herein, a RNTI used by the PDCCH for scheduling the first MCCH uses a network-wide unique identifier, i.e., a fixed value and a RNTI used by the PDCCH for scheduling the first MTCH is configured by the first MCCH.

It should be noted that the names of the first SIB, the first MCCH and the first MTCH are not limited in the embodiments of the present application. For convenience of description, the first SIB may also be abbreviated as a SIB, the first MCCH may also be abbreviated as a MCCH and the first MTCH may also be abbreviated as a MTCH. The PDCCH for scheduling the MCCH (i.e., MCCH PDCCH) is configured by the SIB and the PDCCH is notified by the SIB. Herein, the PDSCH for transmitting the MCCH (i.e., MCCH PDSCH) is scheduled through DCI carried by the MCCH PDCCH. Further, M PDCCHs (i.e., MTCH 1 PDCCH, MTCH 2 PDCCH, MTCH M PDCCH, . . . , for scheduling the MTCH are configured by the MCCH. Herein, the PDSCH for transmitting a MTCH n (i.e., MTCH n PDSCH) is scheduled by DCI carried by the MTCH n PDCCH, where n is an integer greater than or equal to 1 and less than or equal to M. The MCCH and the MTCH are mapped to a DL-SCH. Further, the DL-SCH is mapped to a PDSCH. Herein, the MCCH and the MTCH belong to logical channels, the DL-SCH belongs to a transport channel, and the PDSCH belongs to a physical channel.

Figure 5:
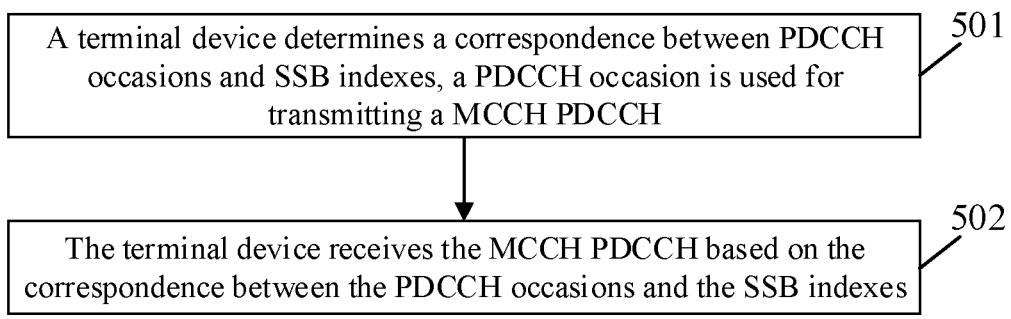
FIG. 5 is a flow diagram of a method for a MCCH scheduling transmission provided by an embodiment of the present application.

FIG. 5 is a flow diagram of a method for a MCCH scheduling transmission provided by an embodiment of the present application. As shown in FIG. 5, the method for the MCCH scheduling transmission includes the following operations.

At 501, a terminal device determines a correspondence between PDCCH occasions and SSB indexes, a PDCCH occasion is used for transmitting a MCCH PDCCH.

At 502, the terminal device receives the MCCH PDCCH based on the correspondence between the PDCCH occasions and the SSB indexes.

In the embodiments of the present application, the PDCCH occasion is used for transmitting the MCCH PDCCH. DCI carried by the MCCH PDCCH schedules the PDSCH for transmitting the MCCH (i.e., MCCH PDSCH). Here, the MCCH PDCCH, the MCCH PDSCH and the MCCH signaling (i.e., the first signaling carried in the MCCH) may refer to the foregoing related description. Herein, the MCCH PDCCH and the MCCH PDCCH are transmitted by the way of beam sweeping. Further, the MCCH PDCCH and the MCCH PDCCH are transmitted by the way of broadcasting.

It should be noted that the PDCCH occasion in the embodiment of the present application can also be referred to as a PDCCH monitor occasion.

In the embodiments of the present application, before the correspondence between the PDCCH occasions and the SSBs is determined, it is required to determine how the PDCCH occasions are numbered (i.e., it is required to determine the indexes of the PDCCH occasions). Therefore, the terminal device acquires first configuration information for determining an MCCH period. Within the MCCH period, the PDCCH occasions corresponding to the MCCH PDCCH are numbered from 0.

Here, the first configuration information is carried in a system broadcast message (such as a SIB).

It should be noted that there is only one MCCH PDCCH within the MCCH period. Optionally, in the case where there are H repeated transmissions for the MCCH PDCCH, there are H repeated transmissions for one MCCH PDCCH within the MCCH period.

It should be noted that the description of the "MCCH period" in the embodiment of the present application can also be referred to as a "MCCH transmission period" or a "MCCH Repetition Period".

The numbering manner of PDCCH occasions is explained below.

In the embodiments of the present application, the first configuration information includes at least one of: first indication information for determining a length of a MCCH period or second indication information for determining a starting position of the MCCH period.

In an optional example, the first indication information indicates T, where T is a positive integer greater than or equal to 1, and the second indication information indicates an offset value (offset). Based on this, the length of the MCCH period is T radio frames, at least one of a radio frame, a subframe, a slot, or a symbol, in which the starting position of the MCCH period is located, is determined based on the offset.

Here, configuration information of the MCCH period may be determined by the network device. The configuration information of the MCCH period includes first indication information and second indication information. The first indication information indicates that the length of the MCCH period is T. The second indication information is indicates an offset for the MCCH period. The starting position of the MCCH period can be determined via the offset.

It should be noted that the MCCH period can also be referred to as a period of transmitting MCCH signaling. Because the MCCH signaling is transmitted repeatedly and periodically, one MCCH signaling is sent within one MCCH period, and one MCCH PDCCH is also transmitted within one MCCH period. In the case of repeated transmission, H repeated transmissions for one MCCH signaling are transmitted in one MCCH period, and H repeated transmissions for one MCCH PDCCH are also transmitted in one MCCH period.

In the embodiments of the present application, the granularity for determining the starting position of the MCCH period may be radio frame granularity (i.e., SFN granularity), subframe granularity, slot granularity or symbol granularity, etc.

In an example in which the SFN granularity is taken as an example, the radio frame in which the starting position of the MCCH period is located satisfies the following expression:

$$SFN \bmod T = \text{offset};$$

where SFN represents an index of a radio frame in which the starting position of the MCCH period is located and mod represents a remainder operation.

In an example in which the subframe is taken as an example, the radio frame and the subframe in which the starting position of the MCCH period is located satisfy the following expressions:

$$SFN \bmod T = \text{floor}(\text{offset}/10);$$

$$\text{subframe} = \text{offset} \bmod 10;$$

where SFN represents an index of a radio frame in which the starting position of the MCCH period is located, subframe represents an index of a subframe in which the starting position of the MCCH period is located, mod represents a remainder operation and floor represents a downward rounding operation.

Further, optionally, the first configuration information in the above solution further includes third indication information for indicating an index of the first PDCCH occasion. Or, the first configuration information does not include third indication information, and the index of the first PDCCH occasion is 0 by default. Herein, the index of the first PDCCH occasion is used for indicating the first PDCCH occasion corresponding to the MCCH PDCCHs within the MCCH period and/or the PDCCH occasion corresponding to the first actually transmitted SSB within the MCCH period.

Further, optionally, the first configuration information in the above solution further includes fourth indication information for indicating repeated transmission times of the MCCH PDCCH. Or, the first configuration information does not include the fourth indication information, and the repeated transmission times of the MCCH PDCCH are 1 by default.

Further, optionally, the first configuration information in the above solution also includes fifth indication information for indicating a search space corresponding to the MCCH PDCCH. Or, the first configuration information does not include the fifth indication information, and the search space corresponding to the MCCH PDCCH includes at least one of the following by default: a search space for other system information (OSI), a search space for remaining minimum system information (RMSI), a search space for a paging or a search space for a random access response (RAR).

In an example, the first configuration information in the above solution includes at least one of:

mcch-RepetitionPeriod (i.e., the first indication information) for determining the MCCH period;

mcch-Offset (i.e., the second indication information) for determine the starting position of the MCCH period;

firstPDCCHOccasion (i.e., the third indication information) for determining an index of the first PDCCH occasion. This information is an optional configuration. If it is not configured, the index of the first PDCCH occasion is 0 by defaults. It should be noted that the index of the first PDCCH occasion is also the index of the PDCCH occasion corresponding to the first actually transmitted SSB;

Repnumber (i.e., the fourth indication information) for determining the transmission times of the MCCH PDCCHs in one MCCH period (i.e., repeated transmission times of the MCCH PDCCHs). This information is an optional configuration. If it is not configured, repeated transmission times of the MCCH PDCCH is 1 by default. It should be noted that the repeated transmission times of the MCCH PDCCH can also be understood as the repeated transmission times of MCCH PDSCH or the repeated transmission times of MCCH signaling;

Mcch-Searchspace (i.e., the fifth indication information) for determining the search space for the MCCH PDCCH. This information is an optional configuration. If it is not configured, the search space for the MCCH PDCCH defaults to a search space for OSI, a search space for RMSI, a search space for a paging or a search space for a RAR.

In the embodiments of the present application, after the PDCCH occasions in the MCCH period are numbered by the above solution, the index of the first PDCCH occasion in the MCCH period is 0, the index of the second PDCCH occasion is 1, and so on. Based on the indexes of all PDCCH occasions within the MCCH period, the correspondence between the PDCCH occasions and the SSB indexes can be determined in any of the following manners.

First Manner

In the scenario that the third indication information (i.e., firstPDCCHOccasion) is not configured in the first configuration information and the MCCH PDCCH is not transmitted repeatedly, for one MCCH PDCCH in the MCCH period, an index of the PDCCH occasion corresponding to the k-th actually transmitted SSB is:

$$k-1;$$

where k is a positive integer greater than or equal to 1 and less than or equal to S and S is the number of actually transmitted SSBs It should be noted that the number of the actually transmitted SSBs is S, in which each actually transmitted SSB has a corresponding SSB index. For example, when S=4, the number of actually transmitted SSBs is 4, the index of the first actually transmitted SSB is 1, the index of the second actually transmitted SSB is 2, the index of the third actually transmitted SSB is 3, and the index of the fourth actually transmitted SSB is 4.

Figure 6:
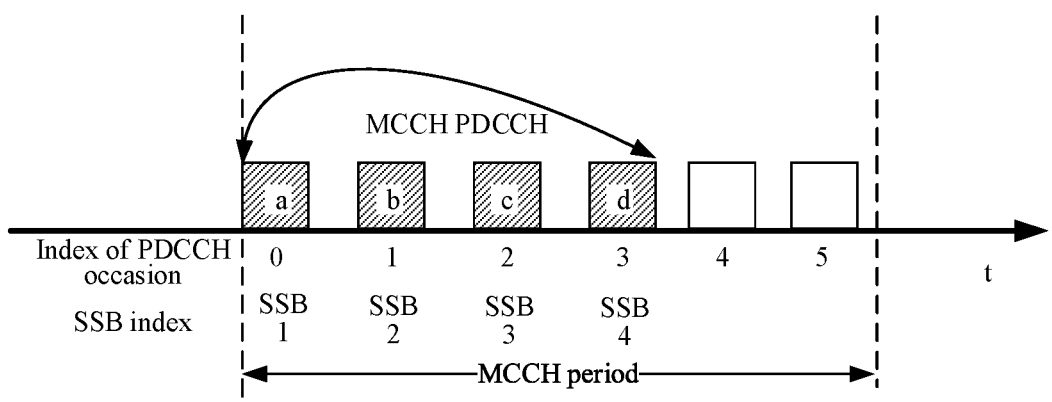
FIG. 6 is a first schematic diagram of a correspondence between PDCCH indexes and SSB indexes provided by an embodiment of the present application.

In an example, refer to FIG. 6, if the third indication information is not configured in the first configuration information, the index of the first PDCCH occasion corresponding to the MCCH PDCCHs in the MCCH period is 0 by default. If the number S of the actually transmitted SSBs is 4, for one MCCH PDCCH within the MCCH period, the index of the PDCCH occasion corresponding to the second actually transmitted SSB is k−1=2−1=1.

Second Manner

In the scenario that the third indication information (i.e., firstPDCCHOccasion) is configured in the first configuration information but there is no repeated transmission, for one MCCH PDCCH within the MCCH period, an index of the PDCCH occasion corresponding to the k-th actually transmitted SSB is:

$$\text{the index of the first PDCCH occasion}+(k-1);$$

where k is a positive integer greater than or equal to 1 and less than or equal to S and S is the number of actually transmitted SSBs.

It should be noted that the number of the actually transmitted SSBs is S, in which each actually transmitted SSB has a corresponding SSB index. For example, when S=4, the number of actually transmitted SSBs is 4, the index of the first actually transmitted SSB is 1, the index of the second actually transmitted SSB is 2, the index of the third actually transmitted SSB is 3, and the index of the fourth actually transmitted SSB is 4.

Figure 7:
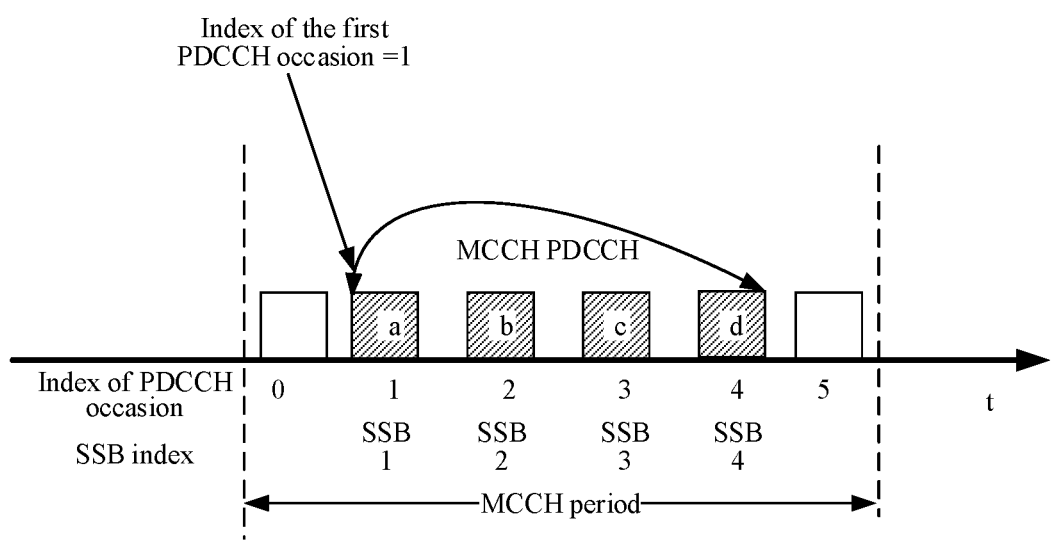
FIG. 7 is a second schematic diagram of a correspondence between PDCCH indexes and SSB indexes provided by an embodiment of the present application.

In an example, refer to FIG. 7, the third indication information is configured in the first configuration information. The third indication information indicates that the index of the first PDCCH occasion is 1. That is, the index of the first PDCCH occasion corresponding to the MCCH PDCCHs in the MCCH period is configured as 1. When the number S of the actually transmitted SSBs is 4, for one MCCH PDCCH within the MCCH period, the index of the PDCCH occasion corresponding to the third actually transmitted SSB is: the index of the first PDCCH occasion+(k−1)=1+(3−1)=3.

Third Manner

The first manner and second manner as mentioned above are for a situation in which the MCCH PDCCHs are not transmitted repeatedly. In an optional example, repeated transmission times of the MCCH PDCCHs is H. H is a positive integer. Here, the value of H is configured by the network device. For example, the value of H is configured through the first configuration information, or the value of H is 1 by default.

It should be noted that the expression that the repeated transmission times of the MCCH PDCCHs is H means that the total transmission times of the MCCH PDCCHs is H. For example, H=2 means that the repeated transmission times of the MCCH PDCCHs is 2, the first repeated transmission refers to an initial transmission, and the second repeated transmission refers to a retransmission.

In the scenario that the third indication information (i.e., firstPDCCHOccasion) is not configured in the first configuration information but there is the repeated transmission, for the h-th repeated transmission of one MCCH PDCCH in the MCCH period, the index of the PDCCH occasion corresponding to the k-th actually transmitted SSB is:

$$S*(h-1)+(k-1);$$

where k is a positive integer greater than or equal to 1 and less than or equal to S, S is the number of actually transmitted SSBs, h is a positive integer greater than or equal to 1 and less than or equal to H and H is the number of the repeated transmissions of the MCCH PDCCHs.

It should be noted that the number of actually transmitted SSBs is S. Herein, each actually transmitted SSB has a corresponding SSB index. For example, when S=4, the number of actually transmitted SSBs is 4, the index of the first actually transmitted SSB is 1, the index of the second actually transmitted SSB is 2, the index of the third actually transmitted SSB is 3, and the index of the fourth actually transmitted SSB is 4.

Figure 8:
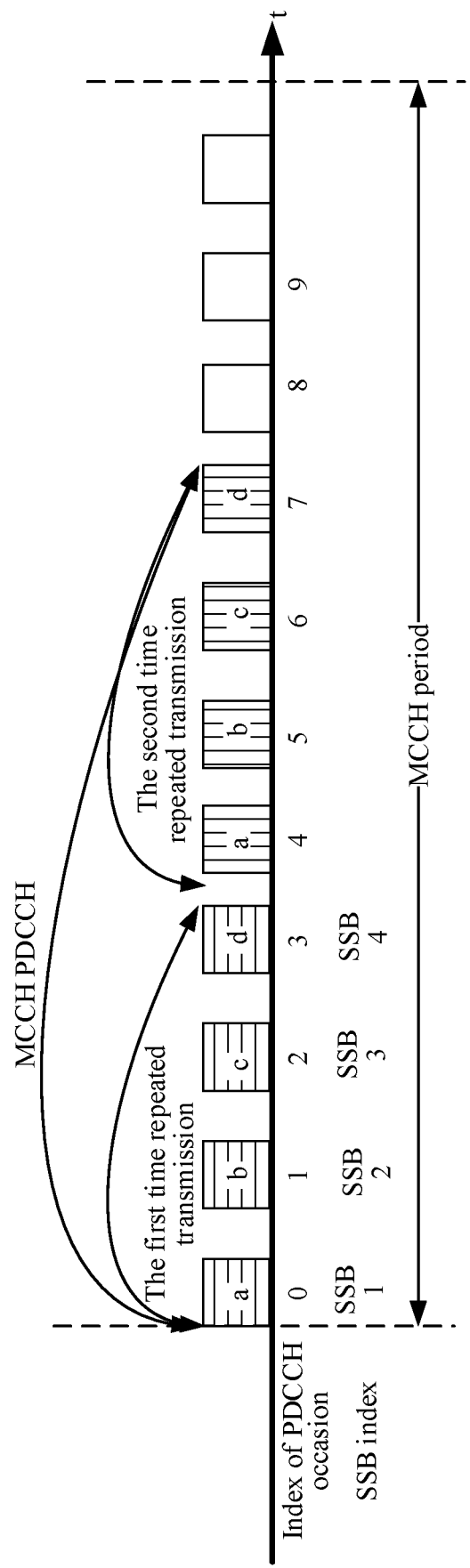
FIG. 8 is a third schematic diagram of a correspondence between PDCCH indexes and SSB indexes provided by an embodiment of the present application.

In an example, refer to FIG. 8, the third indication information is not configured in the first configuration information, that is, the index of the first PDCCH occasion corresponding to the MCCH PDCCHs in the MCCH period defaults to 0. The number S of actually transmitted SSBs is 4. H=2, that is, the repeated transmission times of the MCCH PDCCHs is 2. For the first repeated transmission of the MCCH PDCCHs in the MCCH period, the index of the PDCCH occasion corresponding to the second actually transmission SSB is: S*(h−1)+(k−1)=4*(1−1)+(2−1)=1. For the second repeated transmission of the MCCH PDCCHs in the MCCH period, the index of the PDCCH occasion corresponding to the third actually transmission SSB is: S*(h−1)+(k−1)=4*(2−1)+(3−1)=6.

Fourth Manner

The first manner and the second manner as mentioned above are for a situation in which the MCCH PDCCHs are not transmitted repeatedly. In an optional example, the repeated transmission times of the MCCH PDCCHs is H. H is a positive integer. Here, the value of H is configured by the network device. For example, the value of H is configured through the first configuration information, or the value of H is 1 by default.

It should be noted that the expression that the repeated transmission times of the MCCH PDCCHs is H means that the total transmission times of the MCCH PDCCHs is H. For example, H=2 means that the repeated transmission times of the MCCH PDCCHs is 2, the first repeated transmission refers to an initial transmission, and the second repeated transmission refers to a retransmission.

In the scenario that the third indication information (i.e., firstPDCCHOccasion) is configured in the first configuration information and there is the repeated transmission, for the h-th repeated transmission of one MCCH PDCCH in the MCCH period, the index of the PDCCH occasion corresponding to the k-th actually transmitted SSB is:

the index of the first PDCCH occasion+S*(h−1)+(k−1);

where k is a positive integer greater than or equal to 1 and less than or equal to S, S is the number of actually transmitted SSBs, h is a positive integer greater than or equal to 1 and less than or equal to H and H is the number of the repeated transmissions of the MCCH PDCCHs.

It should be noted that the number of actually transmitted SSBs is S. Herein, each actually transmitted SSB has a corresponding SSB index. For example, when S=4, the number of actually transmitted SSBs is 4, the index of the first actually transmitted SSB is 1, the index of the second actually transmitted SSB is 2, the index of the third actually transmitted SSB is 3, and the index of the fourth actually transmitted SSB is 4.

Figure 9:
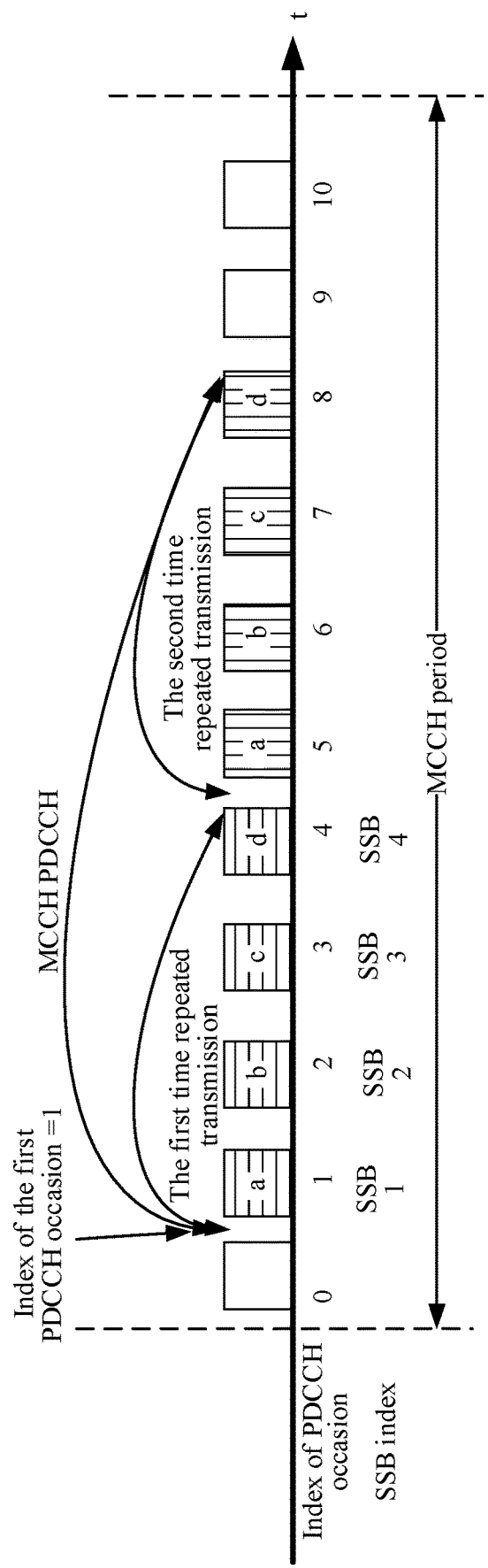
FIG. 9 is a fourth schematic diagram of a correspondence between PDCCH indexes and an SSB indexes provided by an embodiment of the present application.

In an example, refer to FIG. 9, the third indication information is configured in the first configuration information and the third indication information indicates that the index of the first PDCCH occasion is 1. The number S of actually transmitted SSBs is 4. H=2, that is, the repeated transmission times of the MCCH PDCCHs is 2. For the first repeated transmission of the MCCH PDCCHs in the MCCH period, the index of the PDCCH occasion corresponding to the second actually transmission SSB is: the index of the first PDCCH occasion+S*(h−1)+(k−1)=1+4*(1−1)+(2−1)=2. For the second repeated transmission of the MCCH PDCCHs in the MCCH period, the index of the PDCCH occasion corresponding to the third actually transmission SSB is: the index of the first PDCCH occasion+S*(h−1)+(k−1)=1+4*(2−1)+(3−1)=7.

Fifth Manner

The first manner and the second manner as mentioned above are for the situation in which the MCCH PDCCHs are not transmitted repeatedly. In an optional example, the repeated transmission times of the MCCH PDCCHs is H. H is a positive integer. Here, the value of H is configured by the network device. For example, the value of H is configured through the first configuration information, or the value of H is 1 by default.

It should be noted that the expression that the repeated transmission times of the MCCH PDCCHs is H means that the total transmission times of MCCH PDCCHs is H. For example, H=2 means that the repeated transmission times of the MCCH PDCCHs is 2, the first repeated transmission refers to an initial transmission, and the second repeated transmission refers to a retransmission.

In the scenario that the third indication information (i.e., firstPDCCHOccasion) is configured in the first configuration information and there is the repeated transmission, if the index of a respective first PDCCH occasion is configured for each repeated transmission, for the h-th repeated transmission of one MCCH PDCCH in the MCCH period, the index of the PDCCH occasion corresponding to the k-th actually transmitted SSB is:

the index of the first PDCCH occasion corresponding to the h-th repeated transmission of the MCCH PDCCHs+(k−1);

where k is a positive integer greater than or equal to 1 and less than or equal to S, S is the number of actually transmitted SSBs, h is a positive integer greater than or equal to 1 and less than or equal to H and H is the number of the repeated transmissions of the MCCH PDCCHs.

It should be noted that the number of actually transmitted SSBs is S. Herein, each actually transmitted SSB has a corresponding SSB index. For example, when S=4, the number of actually transmitted SSBs is 4, the index of the first actually transmitted SSB is 1, the index of the second actually transmitted SSB is 2, the index of the third actually transmitted SSB is 3, and the index of the fourth actually transmitted SSB is 4.

Figure 10:
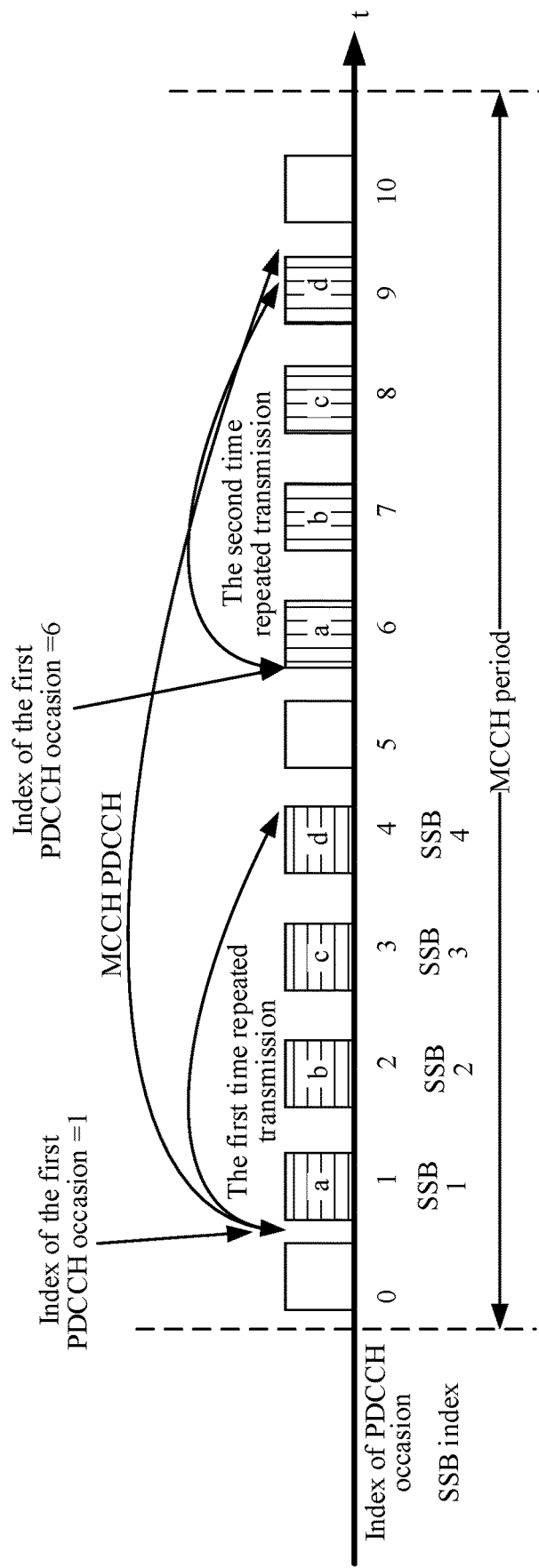
FIG. 10 is a fifth schematic diagram of a correspondence between PDCCH indexes and SSB indexes provided by an embodiment of the present application.

In an example, refer to FIG. 10, the third indication information is configured in the first configuration information and the third indication information indicates that the index of the first PDCCH occasion is 1. Here, the index of the first PDCCH occasion is an index of the first PDCCH occasion corresponding to the first time repeated transmission of the MCCH PDCCHs. In addition, the first configuration information also configures an index of the first PDCCH occasion corresponding to each repeated transmission. For example, the index of the first PDCCH occasion corresponding to the second repeated transmission is 6. The number S of actually transmitted SSBs is 4. H=2, that is, the repeated transmission times of the MCCH PDCCHs is 2. For the first repeated transmission of the MCCH PDCCHs in the MCCH period, the index of the PDCCH occasion corresponding to the second actually transmission SSB is: the index of the first PDCCH occasion corresponding to the h-th repeated transmission of the MCCH PDCCHs+(k−1)=1+(2−1)=2. For the second repeated transmission of the MCCH PDCCHs in the MCCH period, the index of the PDCCH occasion corresponding to the third actually transmission SSB is: the index of the first PDCCH occasion corresponding to the h-th repeated transmission of the MCCH PDCCHs+(k−1)=6+(3−1)=8.

In the embodiment of the present application, after the correspondence between the indexes of the PDCCH occasions and the SSB indexes is determined with the above solutions, the terminal device can monitor the PDCCH occasion at the corresponding position (e.g. the corresponding beam) according to the SSB index, thereby effectively receiving the MCCH PDCCH.

Figure 11:
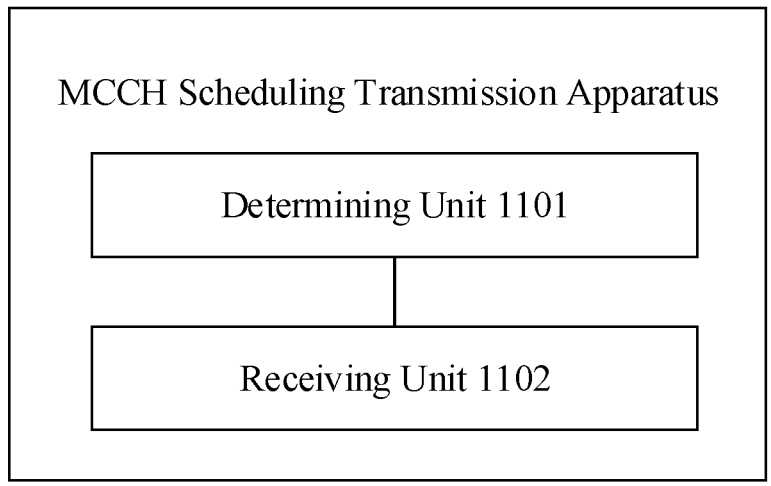
FIG. 11 is a schematic structural diagram of an apparatus for a MCCH scheduling transmission provided by an embodiment of the present application.

FIG. 11 is a schematic structural diagram of an apparatus for a MCCH scheduling transmission provided by an embodiment of the present application. As shown in FIG. 11, the apparatus for the MCCH scheduling transmission is applied to a terminal device and the apparatus for the MCCH scheduling transmission includes a determining unit 1101 and a receiving unit 1102.

The determining unit 1101 is configured to determine a correspondence between PDCCH occasions and SSB indexes. A PDCCH occasion is used for transmitting a MCCH PDCCH.

The receiving unit 1102 is configured to receive the MCCH PDCCH based on the correspondence between the PDCCH occasions and the SSB indexes.

In an optional example, the apparatus further includes an acquiring unit (not shown).

The acquiring unit is configured to acquire first configuration information, the first configuration information is used for determining a MCCH period.

Herein, PDCCH occasions corresponding to MCCH PDCCHs in the MCCH period are numbered from 0.

In an optional example, the first configuration information includes at least one of:

first indication information for determining a length of the MCCH period; or second indication information for determining a starting position of the MCCH period.

In an optional example, the first indication information indicates T. T is a positive integer greater than or equal to 1. The second indication information indicates an offset.

The length of the MCCH period is T radio frames;

At least one of a radio frame, a subframe, a slot and a symbol, in which a starting position of the MCCH period is located, is determined based on the offset.

In an optional example, the radio frame in which the starting position of the MCCH period is located satisfies the following expression:

$$SFN\ mod\ T=offset;$$

where SFN represents an index of the radio frame in which the starting position of the MCCH period is located and mod represents a remainder operation.

In an optional example, a radio frame and a subframe in which the starting position of the MCCH period is located satisfy the following expressions:

$$SFN\ mod\ T=floor(offset/10);$$

$$subframe=offset\ mod\ 10;$$

where SFN represents an index of the radio frame in which the starting position of the MCCH period is located, subframe represents an index of the subframe in which the starting position of the MCCH period is located, mod represents a remainder operation and floor represents a downward rounding operation.

In an optional example, the first configuration information further includes third indication information. third indication information indicates a first PDCCH occasion index. Or, the first PDCCH occasion index is 0 by default.

The index of the first PDCCH occasion indicates the first PDCCH occasion corresponding to the MCCH PDCCHs in the MCCH period and/or a PDCCH occasion corresponding to a first actually transmitted SSB within the MCCH period.

In an optional example, the first configuration information further includes fourth indication information. The fourth indication information indicates repeated transmission times of the MCCH PDCCHs. Or, the repeated transmission times of the MCCH PDCCH are 1 by default.

In an optional example, the first configuration information further includes fifth indication information. The fifth indication information indicates a search space corresponding to the MCCH PDCCHs. Or, a search space corresponding to the MCCH PDCCHs includes at least one of the following by default: a search space for OSI, a search space for RMSI, a search space for a paging and a search space for a RAR.

In an optional example, for one MCCH PDCCH in the MCCH period, an index of a PDCCH occasion corresponding to a k-th actually transmitted SSB is:

$$k-1;$$

where k is a positive integer greater than or equal to 1 and less than or equal to S and S is the number of actually transmitted SSBs.

In an optional example, for one MCCH PDCCH in the MCCH period, an index of a PDCCH occasion corresponding to a k-th actually transmitted SSB is:

an index of a first PDCCH occasion+(k−1);

where k is a positive integer greater than or equal to 1 and less than or equal to S and S is the number of actually transmitted SSBs.

In an optional example, for a h-th repeated transmission of one MCCH PDCCH in the MCCH period, an index of a PDCCH occasion corresponding to a k-th actually transmitted SSB is:

$$S*(h-1)+(k-1);$$

where k is a positive integer greater than or equal to 1 and less than or equal to S, S is the number of actually transmitted SSBs, h is a positive integer greater than or equal to 1 and less than or equal to H and H is repeated transmission times of the MCCH PDCCHs.

In an optional example, for a h-th repeated transmission of one MCCH PDCCH in the MCCH period, an index of a PDCCH occasion corresponding to a k-th actually transmitted SSB is:

an index of a first PDCCH occasion+S*(h−1)+(k−1);

where k is a positive integer greater than or equal to 1 and less than or equal to S, S is the number of actually transmitted SSBs, h is a positive integer greater than or equal to 1 and less than or equal to H and H is repeated transmission times of the MCCH PDCCHs.

In an optional example, for a h-th repeated transmission of one MCCH PDCCH in the MCCH period, an index of a PDCCH occasion corresponding to a k-th actually transmitted SSB is:

an index of a first PDCCH occasion corresponding to the h-th repeated transmission of the MCCH PDCCHs+(k−1);

where k is a positive integer greater than or equal to 1 and less than or equal to S, S is the number of actually transmitted SSBs, h is a positive integer greater than or equal to 1 and less than or equal to H and H is repeated transmission times of the MCCH PDCCHs.

In an optional example, the index of the first PDCCH occasion corresponding to the h-th repeated transmission of the MCCH PDCCHs is configured through the first configuration information.

In an optional example, the first configuration information is carried in a system broadcast message.

Those skilled in the art will appreciate that the above related description of the apparatus for the MCCH scheduling transmission according to the embodiments of the present application may be understood with reference to the related description of the method for the MCCH scheduling transmission according to the embodiments of the present application.

It should be noted that the technical solution in embodiments of the present application can be applied not only to the terminal device side, but also to the network device side, such as the base station. Specifically, the network device determines a correspondence between the PDCCH occasions and the SSB indexes; a PDCCH occasion is used for transmitting a MCCH PDCCH; and the network device transmits the MCCH PDCCH based on the correspondence between the PDCCH occasions and the SSB indexes. Here, the solution for the network device to determine the correspondence between the PDCCH occasions and the SSB indexes can be referred to the above-mentioned description on the terminal device side and will not be described in detail.

Figure 12:
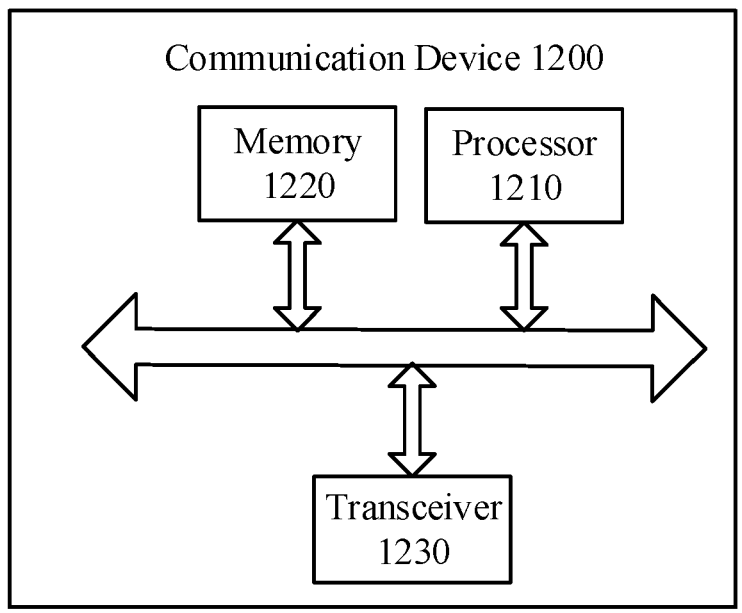
FIG. 12 is a schematic structural diagram of a communication device provided by an embodiment of the present application.

FIG. 12 is a schematic structural diagram of a communication device 1200 provided by an embodiment of the present application. The communication device may be a terminal device or a network device. The communication device 1200 as shown in FIG. 12 includes a processor 1210. The processor 1210 may call and run a computer program from a memory to implement the method according to the embodiments of the present application.

Optionally, as shown in FIG. 12, the communication device 1200 may also include a memory 1220. The processor 1210 may invoke and run a computer program from the memory 1220 to implement the method according to the embodiments of the present application.

The memory 1220 may be a separate device independent of the processor 1210 or may be integrated in the processor 1210.

Optionally, as shown in FIG. 12, the communication device 1200 may also include a transceiver 1230. The processor 1210 may control the transceiver 1230 to communicate with other devices. Specifically, the transceiver 1230 may transmit information or data to other devices or receive information or data transmitted by other devices.

The transceiver 1230 may include a transmitter and a receiver. The transceiver 1230 may further include antennas and the number of the antennas may be one or more.

Optionally, the communication device 1200 can be specifically a network device of the embodiment of the present disclosure, and the communication device 1200 can realize corresponding processes realized by the network device in various methods according to the embodiments of the present disclosure. For the sake of simplicity, it will not be elaborated herein.

Optionally, the communication device 1200 can be a mobile terminal/a terminal device according to the embodiments of the present disclosure, and the communication device 1200 can realize corresponding processes realized by the mobile terminal/the terminal device in the various methods according to the embodiments of the present disclosure. For the sake of brevity, it will not be described herein.

Figure 13:
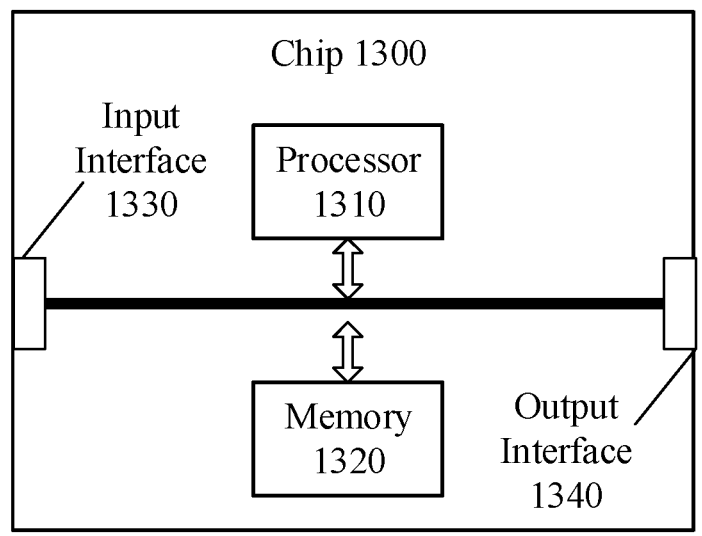
FIG. 13 is a schematic structural diagram of a chip according to an embodiment of the present application.

FIG. 13 is a schematic structural diagram of a chip according to an embodiment of the present disclosure. The chip 1300 as illustrated in FIG. 13 includes processor 1310. The processor 1310 can invoke and run computer programs from a memory to implement the method in the embodiments of the disclosure.

Optionally, as illustrated in FIG. 13, the chip 1300 may also include a memory 1320. The processor 1310 can invoke and run the computer program from memory 1320 to implement the method in the embodiments of the disclosure.

The memory 1320 may be a separate device independent of or may be integrated into the processor 1310.

Optionally, the chip 1300 may also include an input interface 1330. The processor 1310 can control the input interface 1330 to communicate with other devices or chips, and in particular to obtain information or data sent by other devices or chips.

Optionally, the chip 1300 may also include an output interface 1340. The processor 1310 may control the output interface 1340 to communicate with other devices or chips, and in particular to output information or data to other devices or chips.

Optionally, the chip can be applied to the network device in the embodiments of the present disclosure, and the chip can implement the corresponding processes realized by the network device in various methods according to the embodiments of the disclosure. For the sake of brevity, it will not be elaborated herein.

Optionally, the chip can be applied to the mobile terminal/terminal device in the embodiments of the present disclosure, and the chip can implement the corresponding processes realized by the mobile terminal/terminal device in various methods according to the embodiment of the disclosure. For the sake of simplicity, it will not be described herein.

It is to be understood that the chip mentioned in the embodiments of the present disclosure can also be referred to as a system level chip, a system chip, a chip system or a on-chip system chip, etc.

Figure 14:
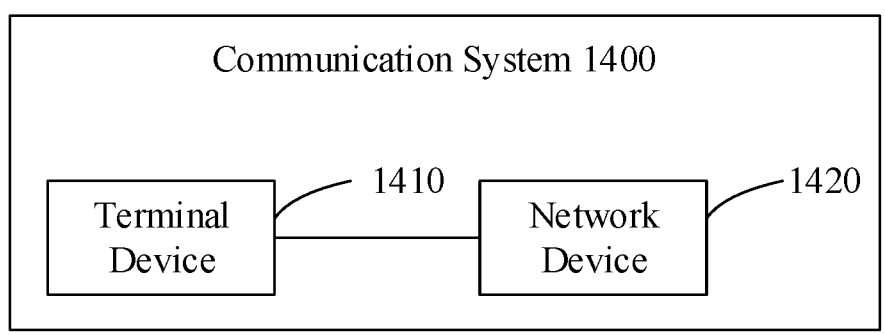
FIG. 14 is a schematic block diagram of a communication system provided by an embodiment of the present application.

FIG. 14 is a schematic block diagram of a communication system 1400 provided by an embodiment of the present disclosure. As illustrated in FIG. 14, the communication system 1400 includes a terminal device 1410 and a network device 1420.

The terminal device 1410 can be used to realize the corresponding functions realized by the terminal device in the above methods, and the network device 1420 can be used to realize the corresponding functions realized by the network device in the above methods. For the sake of simplicity, it will not be elaborated herein.

It is to be understood that the processor in the embodiments of the present disclosure may be an integrated circuit chip with signal processing capability. In the implementation process, various operations in the above method embodiment can be implemented by an integrated logic circuit of hardware in the processor or instructions in the form of software. The above processor can be a general purpose processor, a digital signal processor (DSPS), an application specific integrated circuit (ASIC), a field programmable gate array (FPGA) or other programmable logic devices, discrete gates or transistor logic devices, and discrete hardware components. Various methods, operations and logic block diagrams disclosed in the embodiments of the present disclosure can be implemented or executed. The general-purpose processor may be a microprocessor or the processor may be any conventional processor or the like. The operations of the methods disclosed in connection with the embodiments of the present disclosure can be directly embodied as being implemented by a hardware decoding processor, or by an combination of the hardware and software modules in the decoding processor. The software module can be located in a random memory, a flash memory, a read-only memory, a programmable read-only memory or an electrically erasable programmable memory, a register and other mature storage media in the art. The storage medium is located in the memory, and the processor reads information in the memory and implements the operations of the above methods in combination with its hardware.

It is to be understood that the memory in the embodiments of the present disclosure may be a volatile memory or a non-volatile memory, or may include both a volatile and a non-volatile memory. The nonvolatile memory can be a read-only memory (ROM), a programmable ROM (PROM), an erasable PROM (EPROM), an electrically EPROM (EE- PROM) or a flash memory. The Volatile memory can be a random access memory (RAM), which is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the systems and methods described herein is intended to include, but is not limited to, memories of these and any other suitable type.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM, a DR RAM, etc. That is, the memory in the embodiments of the disclosure is intended to include but not limited to memories of these and any other suitable type.

The embodiments of the disclosure also provide a computer-readable storage medium for storing one or more computer programs.

In one embodiment, the computer-readable storage medium may be applied to the network device of the embodiments of the disclosure. The computer programs may enable a computer to perform the corresponding processes implemented by the network device in various methods of the embodiments of the disclosure, which will not be elaborated herein for brief description.

In one example, the computer-readable storage medium may be applied to the mobile terminal/terminal device of the embodiments of the disclosure. The computer programs may enable a computer to perform the corresponding processes implemented by the mobile terminal/terminal device in various methods of the embodiments of the disclosure, which will not be elaborated herein for brief description.

The embodiments of the disclosure also provide a computer program product. The computer program product includes one or more computer program instructions.

In one example, the computer program product may be applied to the network device of the embodiments of the disclosure. The computer program instructions may enable a computer to perform the corresponding processes implemented by the network device in various methods of the embodiments of the disclosure, which will not be elaborated herein for brief description.

In one example, the computer program product may be applied to the mobile terminal/terminal device of the embodiments of the disclosure. The computer program instructions may enable a computer to perform the corresponding processes implemented by the mobile terminal/terminal device in various methods of the embodiments of the disclosure, which will not be elaborated herein for brief description.

The embodiments of the disclosure also provide a computer program.

In one example, the computer program may be applied to the network device of the embodiments of the disclosure. The computer program, when executed by a computer, enables the computer to perform the corresponding processes implemented by the network device in various methods of the embodiments of the disclosure, which will not be elaborated herein for brief description.

In one example, the computer program may be applied to the mobile terminal/terminal device of the embodiments of the disclosure. The computer program, when executed by a computer, enables the computer to perform the corresponding processes implemented by the mobile terminal/terminal device in various methods of the embodiments of the disclosure, which will not be elaborated herein for brief description.

With the above technical solution, in a scenario where MCCH signaling is transmitted in a manner of beam sweeping, a terminal device determines a correspondence between PDCCH occasions and SSB indexes, because there is an association between SSB indexes and beams, the terminal device can determine a correspondence between the PDCCH occasions and the beams, so as to receive the MCCH PDCCH based on the correspondence, which ensures that the terminal device receives the MCCH PDCCH at a correct position (i.e., through a correct beam). Since the MCCH PDCCH carries the scheduling information of the MCCH signaling, it ensures that the subsequent MCCH signaling can be correctly received and further, the subsequent Multicast Traffic Channel (MTCH) service data can be correctly received.

Those of ordinary skill in the art may realize that the units and algorithm operations of various examples described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between various displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, various functional units in various embodiments of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the methods in various embodiments of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for a multicast control channel (MCCH) scheduling transmission, comprising:
   determining, by a terminal device, a correspondence between physical downlink control channel (PDCCH) occasions and Synchronization Signal/Physical Broadcast Channel (SS/PBCH) Block (SSB) indexes, a PDCCH occasion being used for transmitting a MCCH PDCCH; and
   receiving, by the terminal device, the MCCH PDCCH based on the correspondence between the PDCCH occasions and the SSB indexes;
   wherein the method further comprises:
   acquiring, by the terminal device, first configuration information, the first configuration information being used for determining a MCCH period,
   wherein the first configuration information comprises:
   first indication information for determining a length of the MCCH period; and
   second indication information for determining a starting position of the MCCH period,
   wherein the first indication information indicates T, T is a positive integer greater than or equal to 1 and the second indication information indicates an offset value (offset),
   the length of the MCCH period is T radio frames, and
   a radio frame in which a starting position of the MCCH period is located, is determined based on the offset;
   wherein the radio frame in which the starting position of the MCCH period is located satisfies the following expression:

SFN mod T=offset;

where SFN represents an index of the radio frame in which the starting position of the MCCH period is located, and mod represents a remainder operation.

2. The method of claim 1,
   wherein PDCCH occasions corresponding to MCCH PDCCHs in the MCCH period are numbered from 0.

3. The method of claim 2, wherein,
   the first configuration information further comprises fifth indication information, the fifth indication information indicates a search space corresponding to the MCCH PDCCHs; or,
   a search space corresponding to the MCCH PDCCHs comprises at least one of the following by default: a search space for other system information (OSI), a search space for remaining minimum system information (RMSI), a search space for a paging or a search space for a random access response (RAR).

4. The method of claim 1, wherein, for one MCCH PDCCH in the MCCH period, an index of a PDCCH occasion corresponding to a k-th actually transmitted SSB is:

k−1;

where k is a positive integer greater than or equal to 1 and less than or equal to S and S is a number of actually transmitted SSBs.

5. The method of claim 1, wherein, for one MCCH PDCCH in the MCCH period, an index of a PDCCH occasion corresponding to a k-th actually transmitted SSB is:

an index of a first PDCCH occasion+(k−1);

where k is a positive integer greater than or equal to 1 and less than or equal to S and S is a number of actually transmitted SSBs.

6. The method of claim 1, wherein, for a h-th repeated transmission of one MCCH PDCCH in the MCCH period, an index of a PDCCH occasion corresponding to a k-th actually transmitted SSB is:

S*(h−1)+(k−1);

where k is a positive integer greater than or equal to 1 and less than or equal to S, S is a number of actually transmitted SSBs, h is a positive integer greater than or equal to 1 and less than or equal to H, and H is repeated transmission times of the MCCH PDCCHs.

7. The method of claim 1, wherein the first configuration information is carried in a system broadcast message.

8. A terminal device, comprising:
   a processor; and
   a memory for storing a computer program,
   wherein the processor is configured to execute the computer program to cause the terminal device to perform the following operations:
   determining a correspondence between physical downlink control channel (PDCCH) occasions and Synchronization Signal/Physical Broadcast Channel (SS/PBCH) Block (SSB) indexes, a PDCCH occasion being used for transmitting a MCCH PDCCH; and
   receiving the MCCH PDCCH based on the correspondence between the PDCCH occasions and the SSB indexes;
   wherein the processor is further configured to cause the terminal device to:
   acquire first configuration information, the first configuration information being used for determining a MCCH period,
   wherein the first configuration information comprises:
   first indication information for determining a length of the MCCH period; and
   second indication information for determining a starting position of the MCCH period,
   wherein the first indication information indicates T, T is a positive integer greater than or equal to 1 and the second indication information indicates an offset value (offset),
   the length of the MCCH period is T radio frames, and
   a radio frame in which a starting position of the MCCH period is located, is determined based on the offset;

wherein the radio frame in which the starting position of the MCCH period is located satisfies the following expression:

SFN mod T=offset;

where SFN represents an index of the radio frame in which the starting position of the MCCH period is located, and mod represents a remainder operation.

9. The terminal device of claim 8,
wherein PDCCH occasions corresponding to MCCH PDCCHs in the MCCH period are numbered from 0.

10. The terminal device of claim 9, wherein,
the first configuration information further comprises fifth indication information, the fifth indication information indicates a search space corresponding to the MCCH PDCCHs; or,
a search space corresponding to the MCCH PDCCHs comprises at least one of the following by default: a search space for other system information (OSI), a search space for remaining minimum system information (RMSI), a search space for a paging or a search space for a random access response (RAR).

11. The terminal device of claim 8, wherein, for one MCCH PDCCH in the MCCH period, an index of a PDCCH occasion corresponding to a k-th actually transmitted SSB is:

k−1;

where k is a positive integer greater than or equal to 1 and less than or equal to S and S is a number of actually transmitted SSBs.

12. The terminal device of claim 8, wherein, for one MCCH PDCCH in the MCCH period, an index of a PDCCH occasion corresponding to a k-th actually transmitted SSB is:

an index of a first PDCCH occasion+(k−1);

where k is a positive integer greater than or equal to 1 and less than or equal to S and S is a number of actually transmitted SSBs.

13. The terminal device of claim 8, wherein, for a h-th repeated transmission of one MCCH PDCCH in the MCCH period, an index of a PDCCH occasion corresponding to a k-th actually transmitted SSB is:

S*(h−1)+(k−1);

where k is a positive integer greater than or equal to 1 and less than or equal to S, S is a number of actually transmitted SSBs, h is a positive integer greater than or equal to 1 and less than or equal to H and H is repeated transmission times of the MCCH PDCCHs.

14. A chip comprising a processor, the processor being configured to call and run a computer program from a memory, to cause a device on which the chip is installed to perform the following operations:
determining a correspondence between physical downlink control channel (PDCCH) occasions and Synchronization Signal/Physical Broadcast Channel (SS/PBCH) Blocks (SSB) indexes, a PDCCH occasion being used for transmitting a MCCH PDCCH; and
receiving the MCCH PDCCH based on the correspondence between the PDCCH occasions and the SSB indexes;
wherein the processor is further configured to cause the device on which the chip is installed to:
acquire first configuration information, the first configuration information being used for determining a MCCH period, wherein the first configuration information comprises:
first indication information for determining a length of the MCCH period; and
second indication information for determining a starting position of the MCCH period,
wherein the first indication information indicates T, T is a positive integer greater than or equal to 1 and the second indication information indicates an offset value (offset),
the length of the MCCH period is T radio frames, and
a radio frame in which a starting position of the MCCH period is located, is determined based on the offset;
wherein the radio frame in which the starting position of the MCCH period is located satisfies the following expression:

SFN mod T=offset;

where SFN represents an index of the radio frame in which the starting position of the MCCH period is located, and mod represents a remainder operation.

15. The chip of claim 14, wherein PDCCH occasions corresponding to MCCH PDCCHs in the MCCH period are numbered from 0.

16. The chip of claim 15, wherein,
the first configuration information further comprises fifth indication information, the fifth indication information indicates a search space corresponding to the MCCH PDCCHs; or,
a search space corresponding to the MCCH PDCCHs comprises at least one of the following by default: a search space for other system information (OSI), a search space for remaining minimum system information (RMSI), a search space for a paging or a search space for a random access response (RAR).

17. The chip of claim 14, wherein, for one MCCH PDCCH in the MCCH period, an index of a PDCCH occasion corresponding to a k-th actually transmitted SSB is:

k−1;

where k is a positive integer greater than or equal to 1 and less than or equal to S and S is a number of actually transmitted SSBs.

18. The chip of claim 14, wherein, for one MCCH PDCCH in the MCCH period, an index of a PDCCH occasion corresponding to a k-th actually transmitted SSB is:

an index of a first PDCCH occasion+(k−1);

where k is a positive integer greater than or equal to 1 and less than or equal to S and S is a number of actually transmitted SSBs.

19. The chip of claim 14, wherein, for a h-th repeated transmission of one MCCH PDCCH in the MCCH period, an index of a PDCCH occasion corresponding to a k-th actually transmitted SSB is:

S*(h−1)+(k−1);

where k is a positive integer greater than or equal to 1 and less than or equal to S, S is a number of actually transmitted SSBs, h is a positive integer greater than or equal to 1 and less than or equal to H, and H is repeated transmission times of the MCCH PDCCHs.

20. The chip of claim 14, wherein the first configuration information is carried in a system broadcast message.

* * * * *